Patented Feb. 23, 1943

2,312,265

UNITED STATES PATENT OFFICE 2,312,265

FLUORESCENT MATERIAL

Willard A. Roberts, Euclid, Ohio, assignor to General Electric Company, a corporation of New York No Drawing. Application November 20, 1940, Serial No. 366,433

14 Claims. (Cl. 250—81)

The present invention relates to fluorescent lamps and is directed particularly to new fluorescent materials (phosphors) which are capable of emitting substantially yellow or white light.

It is accordingly an object of my invention to provide new fluorescent materials for fluorescent lamps and a process for manufacturing the same.

In accordance with my invention, I have provided fluorescent materials comprising a base material of either an aluminum or a magnesium oxide activated by vanadium or by vanadium and potassium in conjunction. I have found that these materials will fluoresce with either a bright yellow or a bright white light depending upon whether or not the ingredient potassium is included.

In the preparation of one of such new fluorescent materials, I fire at 1000° C. to 1100° C. for about one hour an intimate mixture of aluminum or magnesium oxide with 0.1 to 10 per cent, but preferably 0.5 to 2 per cent, by weight of vanadium in the form of a suitable compound such as vanadium chloride or vanadium oxide, and from 2 to 10 per cent by weight of a flux material such as the fluoride of either aluminum, magnesium or calcium. The latter permits the reaction to take place at the relatively low temperature specified above. The end product of this process may be termed a vanadium-activated oxide of aluminum or magnesium as the case may be. I have found that this product fluoresces with a bright yellow light when excited by the light from a suitable source of ultra-violet radiation as, for example, a mercury vapor arc discharge.

Another such material may be prepared by intimately mixing a quantity of aluminum or magnesium oxide with 0.1 to 10 per cent, but preferably 0.5 to 5 per cent, by weight of vanadium in the form of a suitable vanadium compound, from 1 to 10 per cent, preferably about 5 per cent, of potassium in the form of some suitable potassium compound and from 2 to 10 per cent of a flux, and firing the resultant admixture for one hour at 1000° C. to 1100° C. Vanadium chloride, vanadium oxide and potassium carbonate are examples of the vanadium and potassium compounds which may be used while the fluorides of aluminum, calcium and magnesium are again examples of suitable fluxes. As before, the flux serves to lower the required firing temperature. The end product of this process may be termed a vanadium and potassium-activated oxide of aluminum or magnesium as the case may be. I have found that this product fluoresces with a bright white light when irradiated by ultra-violet radiation.

In both of the described methods I may substitute for the aluminum oxide either aluminum nitrate, aluminum hydroxide, or any other aluminum or magnesium compound which will decompose at less than about 1000° C. leaving the oxide as a residue. Further it will be understood that many other vanadium or potassium activators and equivalent fluxes of the type mentioned and which may be used in my process will occur to those skilled in the art to which it appertains. All these I am to include within the scope of the appended claims.

The described fluorescent materials may be applied to the interior wall of the envelope of electric discharge devices in which ultra-violet radiations adapted to excite fluorescence in such coating materials are generated. Suitable binders may be used such, for example, as potassium silicate or cellulose acetate. Typical lamps in which the described fluorescent materials may be applied upon the inside of the envelope are described in the Meyer et al. Patent No. 2,182,732, and in the Addink Patent No. 2,211,590.

What I claim as new and desire to secure by Letters Patent of the United States is:

1. A fluorescent material consisting essentially of an oxide of the group consisting of aluminum oxide and magnesium oxide which oxide has combined therewith as an activator a sufficient proportion of vanadium to cause said material to fluoresce with a substantially yellow light.

2. A fluorescent material consisting essentially of an oxide of the group consisting of aluminum oxide and magnesium oxide which oxide has combined therewith as an activator of fluorescence approximately 0.1 to 10 per cent of vanadium, said material fluorescing with a substantially yellow light.

3. The process of forming a fluorescent vanadium-activated oxide of the group consisting of aluminum oxide and magnesium oxide, which process comprises the steps of adding to a quantity of a compound of the group consisting of said oxides and compounds reducible to said oxides when heated to a temperature of less than about 1000° C. from 0.1 to 10 per cent of vanadium in the form of a suitable vanadium compound, intimately mixing, and then firing said mixture.

4. The process of forming a fluorescent vanadium-activated oxide of the group consisting of aluminum oxide and magnesium oxide, which process comprises the steps of mixing from 0.1 to 10 per cent of a suitable vanadium compound and 2 to 10 per cent of a suitable flux material with a quantity of a compound of the group consisting of said oxides and compounds reducible to said oxides when heated to temperatures less than about 1000° C. and firing said mixture at a temperature from 1000° C. to 1100° C.

5. A fluorescent material consisting essentially of an oxide of the group consisting of aluminum oxide and magnesium oxide which oxide has combined therewith as an activator a sufficient proportion of vanadium and potassium to cause said material to fluoresce with a substantially white light.

6. A fluorescent material consisting essentially of an oxide of the group consisting of aluminum oxide and magnesium oxide which oxide has combined therewith as an activator of fluorescence approximately 0.1 to 10 per cent of vanadium and 1 to 10 per cent of potassium, said material fluorescing with a substantially white light.

7. The process of forming a fluorescent vanadium-potassium-activated oxide of the group consisting of aluminum oxide and magnesium oxide, which process comprises the steps of adding to a quantity of a compound of the group consisting of said oxides and compounds reducible to said oxides when heated to temperatures less than about 1000° C. from 0.1 to 10 per cent of vanadium in the form of a suitable vanadium compound, and from 1 to 10 per cent of potassium in the form of a suitable potassium compound, intimately mixing and then firing said mixture.

8. The process of forming a vanadium-potassium-activated oxide of the group consisting of aluminum oxide and magnesium oxide, which process comprises the steps of adding to a quantity of a compound of the group consisting of said oxides and compounds reducible to said oxides when heated to temperatures below about 1000° C. from 0.1 to 10 per cent of vanadium in the form of a suitable vanadium compound, from 1 to 10 per cent of potassium in the form of a suitable potassium compound, and from 2 to 10 per cent of a suitable flux material, intimately mixing and then firing said mixture at a temperature from 1000° C. to 1100° C.

9. A fluorescent material consisting essentially of aluminum oxide containing about 0.1 to 10 per cent of vanadium as an activator.

10. A fluorescent material consisting essentially of aluminum oxide containing about 0.1 to 10 per cent of vanadium and one to 10 per cent of potassium as activators.

11. A fluorescent material consisting essentially of magnesium oxide containing about 0.1 to 10 per cent of vanadium as an activator.

12. A fluorescent material consisting essentially of magnesium oxide containing about 0.1 to 10 per cent of vanadium and one to 10 per cent of potassium as activators.

13. A fluorescent material comprising a matrix consisting essentially of an oxide of a group consisting of aluminum oxide and magnesium oxide, and also comprising a minor proportion of vanadium combined with said matrix as an activator of fluorescence.

14. A fluorescent material as set forth in claim 13 characterized by a minor proportion of potassium also combined with the matrix and affecting the quality of the fluorescent light emitted by the material.

WILLARD A. ROBERTS.